Aug. 19, 1969  J. W. GROSSKOPF, JR., ET AL  3,461,624
MOUNTING GLASS SHEETS
Filed Dec. 6, 1965

INVENTORS
John W. Grosskopf, Jr.,
BY Arthur S. Prayer and
Robert H. Wilker
Nobbe & Swope
ATTORNEYS

United States Patent Office 3,461,624
Patented Aug. 19, 1969

3,461,624
MOUNTING GLASS SHEETS
John W. Grosskopf, Jr., Perrysburg, Arthur G. Thayer, Rossford, and Robert H. Welker, Perrysburg, Ohio, assignors to Libbey-Owens-Ford Glass Company, Toledo, Ohio, a corporation of Ohio
Filed Dec. 6, 1965, Ser. No. 511,912
Int. Cl. B24b 19/00, 7/00, 9/00
U.S. Cl. 51—277   6 Claims

ABSTRACT OF THE DISCLOSURE

Mounting glass sheets upon surfacing tables by moving a plurality of the tables along a fixed path in end-to-end relation, moving the glass sheets along a path converging with the surface of the tables to bring the sheets into face-to-face relation therewith, and applying a fluid suspension of a bedding material between the sheets and surface before the sheets engage the surface.

---

The present invention relates broadly to the surfacing of glass sheets and more particularly to mounting glass sheets or blanks on supporting tables for grinding and polishing.

In the surfacing of glass sheets according to one known process, a plurality of sheets are mounted upon a series of tables arranged in end-to-end relation and movable continuously along a predetermined, substantially horizontal path to carry the sheets first beneath and in engagement with a series of grinding units and then beneath and in engagement with a series of polishing units.

According to this process the glass sheets are laid end-to-end upon the surfaces of moving tables in slightly spaced relation and it is customary to mount or secure the sheets to the table surface or top by embedding them in a layer of plaster of Paris or the like. As is well known in the art, the quality of the resultant finish on the glass sheet, as well as the amount of breakage during the grinding and polishing operation, depend to a considerable extent upon the proper bedding of the sheets on the table surfaces. Heretofore, this was accomplished by coating the entire surface area of a table with a layer of plaster of Paris and thereafter lowering a glass sheet onto the coated table top by means of a crane or other suitable device with the sheets being manually guided into the proper position. The table was thereafter passed beneath a pressure roller or rollers to firmly embed the sheet in the plaster of Paris. However, several problems have been encountered by this procedure.

In the glass laying procedure outlined above, one of the most common methods of applying the plaster to the tops of the glass support tables was by sloshing a mixture or a suspension of plaster in water from a pail over the entire surface area of the table which was to subsequently receive the sheet for the grinding and polishing operation. However, this presented several difficulties in that as the pail of plaster suspension was being carried from the mixer to the tables the plaster would begin to settle in the water so that a uniform suspension was not maintained. Furthermore, it was practically impossible for a man to throw a water suspension of plaster from the pail in a manner to spread a layer of the mixture uniformly across the surrface of the table.

In order to overcome some of the difficulties encountered in the application of plaster in the above manner, various procedures have been proposed for spraying or otherwise depositing the plaster layer onto the table tops as the tables are moving along the predetermined path to produce a more uniform layer for receiving the glass sheets. However, these prior art methods of applying the plaster presented one serious drawback in bedding glass sheets upon the table tops because large sized glass sheets often required that an area upwardly of 170 square feet had to be flooded with the bedding material prior to the laying of the glass sheet on the surface of the table.

The major difficulty encountered was that the layer of bedding material could begin to set before an area of sufficient size to receive a large sheet was covered and the sheet located thereon. This resulted in strains being set up in the glass tending towards breaking thereof during the grinding and polishing operation or causing imperfections in the glass when the strained sheets were removed from the bedding material. Furthermore, the sheet could not be properly embedded in the material and the surface to be worked upon would not be parallel with the table surrface thereby resulting in a nonuniform thickness of the sheet after the grinding and polishing operation.

As can readily be appreciated, it is extremely important that the sheet be placed on the coated surface of the table in close proximity of time to the application of the layer of bedding material since any delay will allow the material to set and the sheet cannot thereafter be properly embedded in the material. This produces another major drawback in securing the sheets to the tables by the prior art methods in that ofttimes the sheet is not available at the proper time. This delay could be dependent on various factors. Furthermore, in using a crane or similar means of supplying sheets to the table surface it has been found that the grinding and polishing lines could not be operated at maximum speeds because of the limitation as to the number of sheets that could be supplied during any given period of time.

The primary object of the invention therefore is to provide an improved method of continuous supplying glass sheets to a glass surfacing line.

Another object is to provide an improved method of mounting glass sheets on a moving surface in such a manner that the sheet is received on the bedding material while the material is still in a fluid condition.

A further object is to provide a method of mounting glass sheets wherein the bedding material and a portion of the glass sheets are received on a moving surfacing table substantially simultaneously.

A still further object is to provide a method of mounting glass blanks wherein a table surface is moved along a fixed path with a glass blank moving along a path converging with said fixed path and a uniform layer of bedding material is placed on the moving surface adjacent the intersection of the two paths.

Still another object is the provision of improved method and apparaatus for mounting glass sheets on glass supporting tables in which the bedding material and a portion of the glass sheet to be placed on the bedding material are applied to the mounting tables continuously and substantially simultaneously.

Other objects and advantages of the invention will become more apparent during the course of the following description when read in connection with the accompanying drawings.

In the drawings, wherein like numerals are employed to designate like parts throughout the same:

Figure 1:
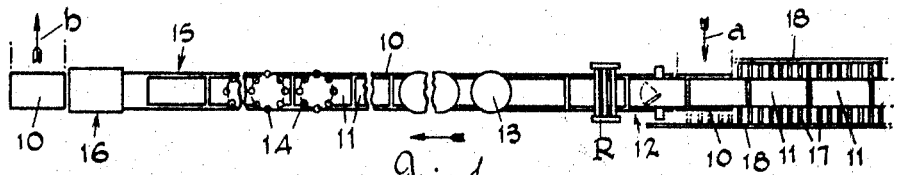
FIG. 1 is a plan view of a form of continuous system for surfacing glass sheets embodying the present invention.
Figure 2:
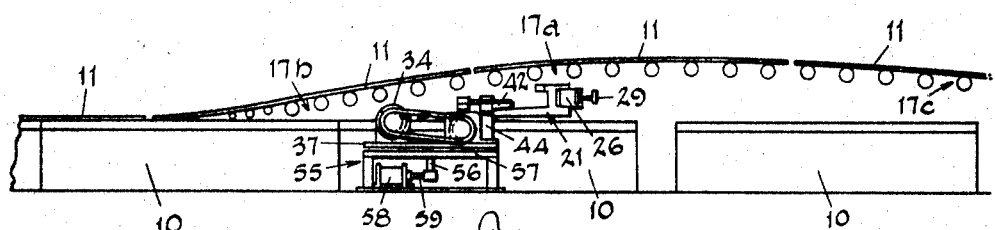
FIG. 2 is an elevational view of a portion of the system shown in FIG. 1.

With reference now to the drawings, the continuous system for surfacing glass sheets having the features of the present invention incorporated therein is shown in FIG. 1. The continuous system includes a plurality of tables 10 which are moved transversely along a line, designated by the letter *a*, to a predetermined substantially, horizontal path. The tables are arranged in end-to-end relation and driven by a suitable power source (not shown) to move the upper surfaces along the predetermined fixed path. Glass sheets or blanks 11 are placed upon the surfaces of the tables at a laying station 12 and carried along the path first beneath and in engagement with pressure rolls R, a series of grinding runners 13, and a series of polishing runners 14. The sheets are then removed from the tables at a stripping station 15, turned over, and thereafter passed along a similar path to grind and polish the opposite or second side. The tables are passed through a washing station 16 and transferred along a line, designated by the letter *b* to be used in another operation.

As noted above, the quality of the finished unit passing through a grinding and polishing line depends to a large extend upon the proper laying of the glass sheets upon the table top and securing them to the table top by properly embedding the sheets in the bedding material. Also, the speed at which the grinding and polishing line may be operated depends to a large extent upon the ability of supplying sheets to the loading station at the proper time.

As was indicated above, it has been customary to mount glass blanks or sheets 11 upon the tops or surfaces of the tables by first spreading a mixture of bedding material to coat the surface, moving a glass blank above the coated surface with a crane or other device and then lowering the blank or sheet upon the coated surface. Thereafter, the tables passed beneath a pressure roller R to firmly embed the sheets in the plaster.

However, in accordance with this invention, the use of a crane or other device at the loading station is eliminated and a continuous supply of sheets is provided which move along a path converging with the fixed path and onto the coated surface at a speed corresponding to the speed of the tables to bring the sheets in face-to-face contact with the moving table surfaces.

To this end, the glass sheet receiving means includes a first portion spaced above the fixed path of the moving surface and a second portion on an inclined plane extending towards and intersecting with the fixed path with means associated with the receiving means to successively deposit glass sheets on the coated table surfaces, thereby providing a continuous supply of sheets to the moving table surfaces.

In the illustrative embodiment of the invention, the receiving means consists of a conveyor defined by a plurality of rollers 17 each extending transversely of the path with adjacent rollers being parallel and spaced longitudinally of the path. The opposite ends of each roller are journaled in support members 18 and are driven by a common power source (not shown) at approximately the speed of the moving tables.

Although the conveyor may be located along any desired plane beyond the loading station it is important that the portion adjacent the loading station be spaced above the predetermined path of the moving surfaces and one end of the conveyor at the loading station be inclined towards the surfaces to intersect with the table tops at a point where the sheets are to be received onto the coated table tops.

In the illustrated embodiment of the invention, the first portion of the receiving means or the conveyor is designated by 17a with the second portion designated 17b. The means for supplying the glass sheets to the first portion of the receiving means includes an extension 17c of the conveyor which extends beyond the path of travel of the tables for receiving glass sheets to be conveyed to the first portion.

In operation, glass sheets are loaded and aligned on the conveyor at a location remote from the loading station so that a continuous supply of aligned sheets is readily available at the loading station. The loading may be performed by any apparatus such as by automatic loading devices or other suitable means. The only requirement in loading and moving the moving sheets to the first portion of the conveyor is that it be done in a manner to provide a continuous supply of moving sheets at the loading station which are transversely aligned with the moving surfaces and spaced longitudinally along the path the desired distance.

As will be appreciated, effective operation of the continuous grinding and polishing line not only depends upon providing a continuous supply of glass sheets at the loading station, but also upon effective means for continuously supplying a bedding material uniformly across the table surfaces to receive the glass sheets before the bedding material has had an opportunity to set up. Furthermore, the arrangement of the glass receiving or conveying means limits the space available for locating appropriate apparatus for supplying bedding material.

For this purpose, in accordance with another aspect of the invention, a plaster slurry, such as plaster of Paris or other suitable bedding material, is uniformly applied across the surface of the moving table by novel apparatus at a point in close proximity to intersection of the conveyor and the table top. Therefore, the bedding material is still in a fluid condition upon receiving the glass sheet. In fact, by the novel arrangement of supplying bedding material, the leading portion of a glass sheet is received by the coated table surface before the portion of the table surface before the portion of the table surface to receive face to receive the trailing portion of the same sheet is coated with the bedding material.

To these ends, a uniform plaster slurry or fluid suspension of bedding material, is continuously supplied by oscillating an open end of a continuous supply means from edge to edge of the moving table surface. Two bedding material supply means or apparatus are shown for a purpose to be described later; however, since the apparatus are identical in construction, only one will be described in detail. The apparatus 19 for coating the table surface comprises an oscillating member, a linkage system and a driving unit.

The oscillating member includes a rigid tubing 20 which is pivotally mounted above the fixed path intermediate the side edges of the moving surface by an L-shaped support 21 having one leg 22 substantially U-shaped to receive and support the tubing 20. The opposite leg 23 is provided at its upper and lower ends with lugs 24 projecting rearwardly with openings 25 formed therein. The L-shaped support member is pivotally mounted on a block 26 by a pivot pin 27 extending through openings 25 and an opening 28 in the block. The block also includes L-shaped extensions to form slots for receiving a portion of a bridging member 29 extending transversely above the table tops or surfaces with opposite ends of the bridging member supported on pedestals 30. The block is held in position on the bridging member by set screws 31 threaded through openings in the block and engaging the bridging member.

One end of the tubing 20 is connected to a coupling 32 which threadedly receives a piece of flexible tubing or hose 33 for continuously supplying plaster slurry from a suitable mixing and pumping apparatus (not shown).

The oscillating member is pivoted about the pivot pin 27 by a driving member including a motor 34 having its output shaft connected to a gear box 35 through a chain 36 or similar type of belt with the motor and gear box supported on a base 37. The output shaft 38 of the gear box is provided with a crank extension 39 which is connected to the oscillating member through the linkage system that includes a bar 40 having one end pivotally mounted to the crank extension by a pivot pin 41. The opposite free end of the bar is similarly connected by a pivot pin 41 to one end of a pivoting member 42 rotatably mounted above the base 37 on a shaft 43 received in a boss 44 extending above and rigidly connected to the upper surface of the base.

The oscillating member is connected to the opposite end of the pivoting member 42 through a hollow casing or tubing 45 with the opposite ends of the casing having squared portions 46. A C-shaped clamp 47 having a threaded stud is mounted in each of the threaded openings of the caps with one of the clamps pivotally secured to an extension 48 integral with the leg 23 of support member 21 by a bolt 49. The second C-shaped clamp is pivotally mounted on an adjustable support block 50 by a bolt. Therefore, by having oppositely directed threads on the respective C-shaped clamps the effective length of the member may readily be changed by rotating the casing in either direction, for a purpose to be described hereinafter.

The support block 50 is guided to sliding movement on the pivoting member 42 by a threaded stud 51 extending through a threaded opening 52 in the block with opposite ends of the threaded stud being journaled in integral extensions 53 extending above the pivoting member. The opposite ends of the stud have enlarged portions 54 to retain the stud between the extensions and one end is provided with a squared portion to receive a wrench. By rotating the threaded stud in the appropriate direction the block may be moved in an appropriate position with respect to the pivoting member.

The bar 40, pivoting member 42 and tubing 45, with the associated elements, provides an adjustable linkage system for connecting the drive shaft of the gear box to the oscillating member. The dual adjustment provides a means for changing the effective length of arc which will be traveled by the oscillating member or more particularly the open end of the tube 20. In other words, by rotating the tubular member in either direction the effective length of the member will be changed thereby effecting the amount of arcuate movement of the oscillating member. The second adjustment is provided by the threaded stud to effect minor changes in the arc of travel of the moving oscillating member. As can readily be appreciated by the dual adjusting feature, the oscillating member may be accurately adjusted to provide an arc of motion at the open end of the tube 20 which is the exact width of the surface to be coated with the bedding material.

In order to have a continuous supply of plaster slurry, it is desirable to have two identical units or feeding apparatus 19 mounted at opposite sides of the path with suitable mechanisms for moving one of the units into operative position while the opposite unit is moved to an inoperative position for maintenance or any other purpose. This is accomplished by means for rotating each of the driving members to move the free end of one of the driving members to an inoperative position beyond a side edge of the moving table surface and the free end of the other oscillating member to an operative position which will then be oscillated across the table surface to supply the bedding material.

Figure 3:
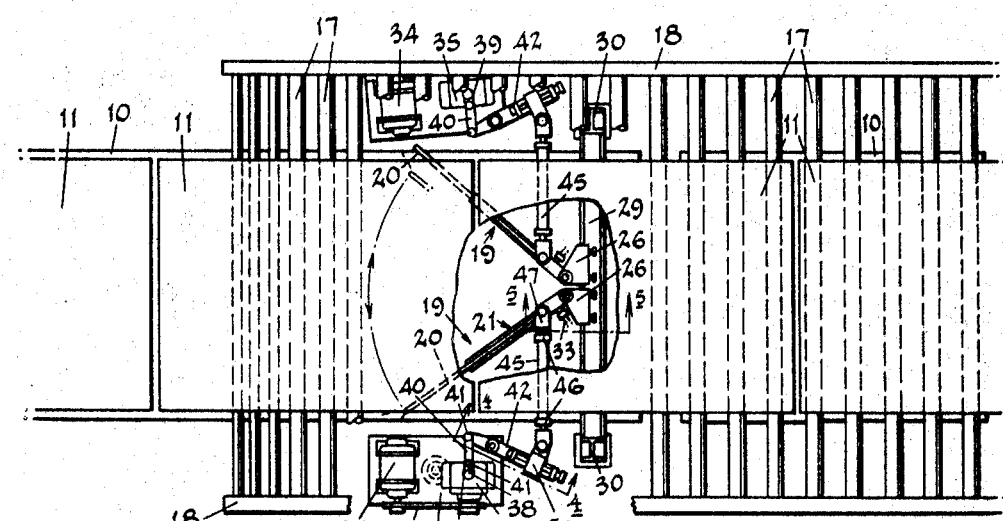
FIG. 3 is an enlarged plan view of the apparatus shown in FIG. 2, with parts thereof broken away.
Figure 4:
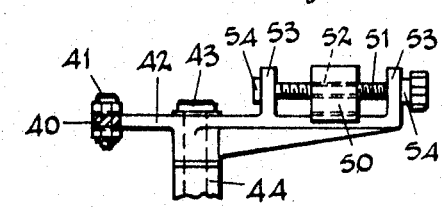
FIG. 4 is a fragmentary vertical sectional view taken along lines 4—4 of FIG. 3.
Figure 5:
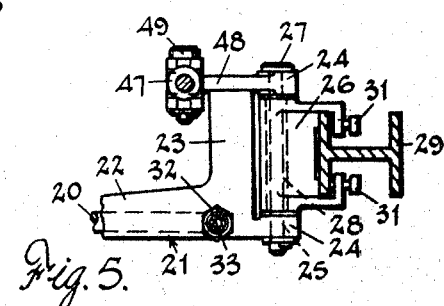
FIG. 5 is an enlarged vertical sectional view taken along lines 5—5 of FIG. 3.

To this end, the base 37 for the motor and gear box is pivotally mounted on a support member 55 by a shaft 56 rigidly secured to the lower surface of the base and extending through an opening in the upper surface 57 of the support member. Any pivoting mechanism may be provided and in the illustrative embodiment, the movement is supplied by a cylinder 58 having its piston rod 59 connected to the shaft 56 extending below the upper surface of the support member. By providing fluid pressure to the appropriate end of the cylinder, the support base of one driving member is pivoted on the support surface to move the unit from the operative position shown in the lower portion of FIG. 3 to the inoperative position shown in the upper portion of FIG. 3. This pivotal movement will move the oscillating unit a sufficient distance about the pivot point or pin 27 to have the free end extend beyond or over the side edge of the moving surface thereby allowing sufficient room for the opposite oscillating member to oscillate along the same general path.

In operation, the two units may be pivoted simultaneously by applying fluid pressure at the appropriate end of the respective cylinder thereby moving one unit to the operative position and the second unit to the inoperative position. At the same time, the continuous supply of bedding material may be switched from one unit to the presently operative unit by a suitable valve, thereby providing a continuous supply of bedding material to the table surface.

As can readily be appreciated, an improved method and apparatus are provided for continuously supplying and bedding glass sheets on the moving surfaces of a grinding and polishing line. The arrangement has allowed for increased speeds on the grinding and polishing lines with a considerable savings in manpower and bedding material and superior quality and increased quantity in the final units.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. Apparatus for mounting glass sheets upon a moving surface for subsequent grinding and polishing, including means for moving said surface along a fixed path, a glass blank conveyor having a first portion spaced above said surface and a second portion on an inclined plane extending downward towards and intersecting said fixed path, means for supplying glass blanks to said first portion, means for depositing bedding material uniformly across said moving surface adjacent the intersection of said inclined plane and said fixed path, and means for moving glass blanks from said first portion along said second portion onto the bedded surface.

2. Apparatus for mounting glass sheets as defined in claim 1, in which said conveyor includes a plurality of rollers extending transversely across said fixed path and longitudinally spaced along said fixed path.

3. Apparatus for mounting glass sheets as defined in claim 1, in which said glass supplying means comprises an extenion of said conveyor beyond said first portion and adapted to continuously receive said glass blanks and move them to said first portion whereby a continuous supply of sheets is available along said second portion.

4. Apparatus for mounting glass sheets as defined in claim 1, in which said bedding material depositing means includes an oscillating member having one end fixed above said path and between opposite sides of said moving surface, a continuous source of supply to said oscillating member, and means for driving said oscillating member from edge to edge of said surface.

5. Apparatus for mounting glass sheets as defined in claim 4, in which said driving means includes a driving member and linkage system connecting said driving member, said linkage system having means for adjusting the length of the edge to edge movement of said oscillating member.

6. Apparatus for mounting glass sheets upon a moving surface for subsequent grinding and polishing, including means for moving said surface along a fixed path, glass blank receiving means having a first portion spaced above said surface and a second portion on an inclined plane extending towards and intersecting said fixed path, means for supplying glass blanks to said first portion, means for depositing bedding material uniformly across said moving surface adjacent the intersection of said inclined plane and said fixed path, including first and second depositing units operating alternately to continuously supply said bedding material, each of said units including an oscillating member having opposite ends with one end pivotally mounted above said path intermediate the side edges of said moving surface and the opposite free end adapted to move from side to side of said moving surface, a driving member rotatably mounted adjacent said path for moving the free end from edge to edge of said moving surface and an adjustable linkage system connecting said driving member to said oscillating member, means for rotating each of said driving members to move the free end of one of the oscillating members to an inoperative position beyond a side edge of said moving surface and the free end of the other of said oscillating members to an operative position, and means for continuously supplying bedding material to the free end of said operative oscillating member, and means for moving glass blanks from said first portion along said second portion onto the bedded surface.

References Cited

UNITED STATES PATENTS

| | | |
|---|---|---|
| 2,841,205 | 7/1958 | Bird. |
| 3,078,625 | 2/1963 | Sporer _____ 51—283 |
| 2,780,039 | 2/1957 | Cusick _____ 51—277 X |
| 2,667,018 | 1/1954 | Dunipace et al. _____ 51—277 |
| 2,363,631 | 11/1944 | Walters _____ 51—277 |

JAMES L. JONES, Primary Examiner

U.S. Cl. X.R.

51—5